United States Patent
Liu et al.

(10) Patent No.: US 9,941,585 B2
(45) Date of Patent: Apr. 10, 2018

(54) ANTENNA SYSTEM

(71) Applicant: Huawei Technologies Co., Ltd., Shenzhen (CN)

(72) Inventors: Yu Liu, Chengdu (CN); Yi Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 14/752,256

(22) Filed: Jun. 26, 2015

(65) Prior Publication Data

US 2015/0295308 A1    Oct. 15, 2015

Related U.S. Application Data

(63) Continuation of application No. PCT/CN2012/087486, filed on Dec. 26, 2012.

(51) Int. Cl.
*H01Q 1/52* (2006.01)
*H04B 15/00* (2006.01)
*H01Q 1/42* (2006.01)

(52) U.S. Cl.
CPC ............ *H01Q 1/525* (2013.01); *H01Q 1/42* (2013.01); *H04B 15/00* (2013.01)

(58) Field of Classification Search
None
See application file for complete search history.

(56) References Cited

U.S. PATENT DOCUMENTS

| | | | |
|---|---|---|---|
| 2,103,357 A | 12/1937 | Gerhard | |
| 4,091,388 A * | 5/1978 | Fiscus | G01S 7/4026 343/872 |
| 6,496,683 B1 | 12/2002 | Kim et al. | |
| 7,365,702 B2 * | 4/2008 | Liu | H01Q 19/17 343/815 |
| 8,681,064 B2 * | 3/2014 | Isom | H01Q 15/0013 343/753 |

(Continued)

FOREIGN PATENT DOCUMENTS

| CN | 1241855 A | 1/2000 |
|---|---|---|
| CN | 201374389 Y | 12/2009 |

(Continued)

OTHER PUBLICATIONS

Choi et al., "Acheiving Single Channel, Full Duplex Wireless Communication," MobiCom '10, Sep. 20-24, 2010, 12 pages.

*Primary Examiner* — Howard Williams
(74) *Attorney, Agent, or Firm* — Slater Matsil, LLP (57) ABSTRACT

The present invention relates to the communications field, and in particular, to an antenna system. The antenna system includes: a transmit antenna, a receive antenna, a radome above the transmit antenna and the receive antenna, and a reflector within the radome, where a signal received by the receive antenna after a transmitted signal of the transmit antenna is reflected by the reflector offsets an intra-frequency interference signal generated because the transmitted signal of the transmit antenna is directly received by the receive antenna. As a result, according to the embodiments of the present invention, the intra-frequency interference signal of the transmit antenna to the receive antenna may be eliminated without increasing the number of antennas and a distance between antennas.

13 Claims, 5 Drawing Sheets

(56) References Cited

U.S. PATENT DOCUMENTS

| | | |
|---|---|---|
| 2005/0062660 A1 | 3/2005 | Henderson et al. |
| 2011/0116404 A1 | 5/2011 | Shimizu |
| 2012/0169552 A1 | 7/2012 | Lee et al. |
| 2014/0118217 A1* | 5/2014 | Cannon .................. H01Q 1/425 343/872 |

FOREIGN PATENT DOCUMENTS

| | | | |
|---|---|---|---|
| CN | 102480060 A | | 5/2012 |
| CN | 102570058 A | | 7/2012 |
| JP | 2000009836 A | * | 1/2000 |
| JP | 2002077164 A | | 3/2002 |
| JP | 201273853 A | | 4/2012 |
| SG | 189121 A1 | | 5/2013 |
| WO | 03090384 A1 | | 10/2003 |
| WO | 2012043442 A1 | | 4/2012 |

* cited by examiner

ANTENNA SYSTEM

CROSS-REFERENCE TO RELATED APPLICATIONS

This application is a continuation of International Application No. PCT/CN2012087486, filed on Dec. 26, 2012, which is hereby incorporated by reference in its entirety.

TECHNICAL FIELD

The present invention relates to the communications field, and in particular, to an antenna system.

BACKGROUND

A microwave communication device generally transmits and receives a signal simultaneously using different frequencies. This frequency utilization manner causes a waste of frequency spectrum resources. Therefore, a full-duplex communication technology, that is, a frequency spectrum utilization manner where data transmitting and data receiving are performed simultaneously on the same frequency spectrum, is proposed. This can greatly improve frequency spectrum utilization efficiency.

A critical problem in full-duplex communication is that, because a device performs transmitting and receiving on the same frequency, a transmit antenna of the device causes intra-frequency interference to a local receive antenna, and the intra-frequency interference cannot be suppressed by using a filter. Therefore, it is a critical problem to be solved to increase isolation between transmit and receive antennas of the device for implementing full-duplex communication.

At present, the following two existing technologies are available to solve the intra-frequency interference problem between transmit and receive antennas of a device in the full-duplex communication technology.

Figure 1:
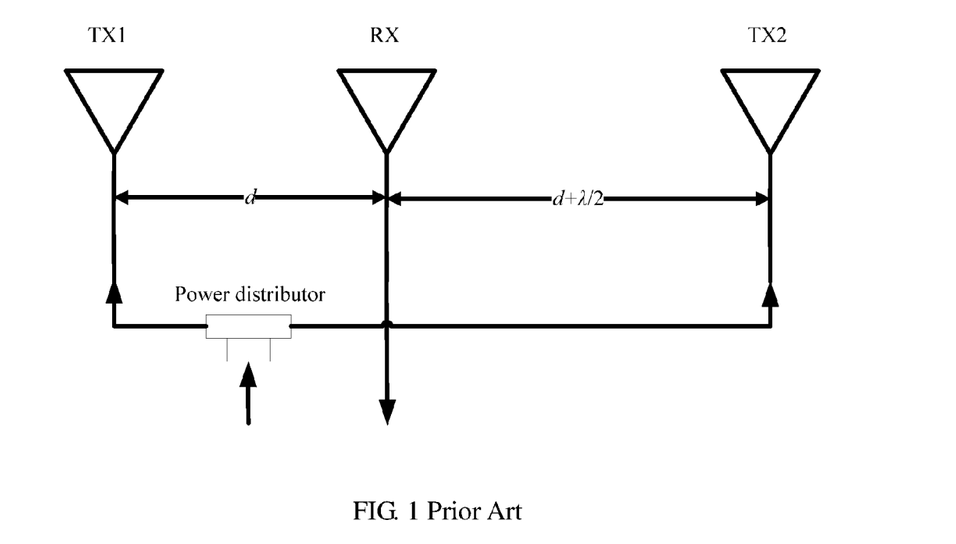
FIG. 1 is a schematic structural diagram of an antenna system according to an embodiment of the prior art.
Figure 2:
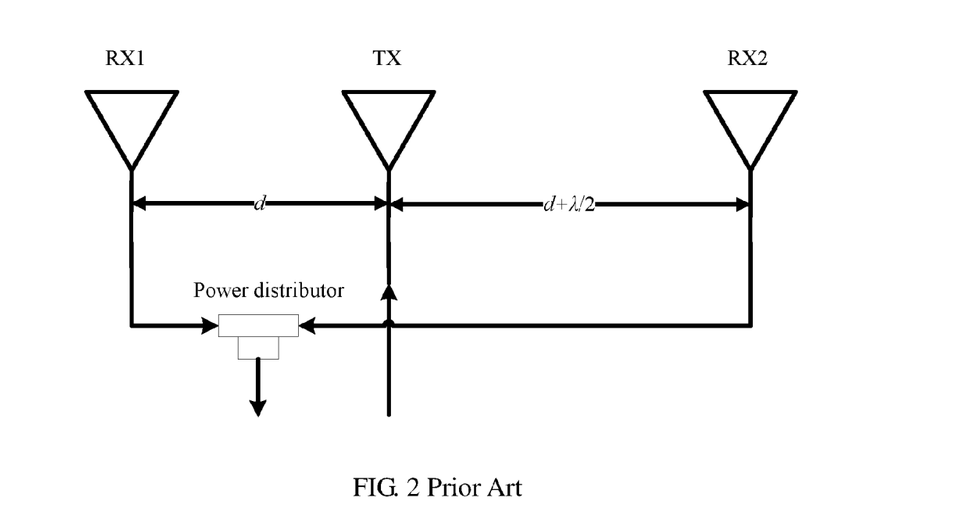
FIG. 2 is a schematic structural diagram of an antenna system according to another embodiment of the prior art.

FIG. 1 and FIG. 2 illustrate a technical solution using three antennas in the prior art. As shown in FIG. 1, the technical solution uses two transmit antennas TX1 and TX2, and one receive antenna RX. A difference in a distance between the two transmit antennas and the receive antenna is $\lambda/2$, where $\lambda$ is a carrier wavelength. A signal transmitted by the transmit antennas TX1 and TX2 is received by the receive antenna RX, resulting in intra-frequency interference.

In this solution, a transmitted signal is split by a power splitter into two identical signals which are respectively fed into the transmit antennas TX1 and TX2. Because a difference in the distance to the position of the receive antenna is $\lambda/2$, a difference in a phase of the two transmitted signals arriving at the receive antenna is 180°, and therefore interference of the two signals are offset against each other.

In this technical solution, one of the transmit antennas is used to generate an offsetting signal to offset interference of the other transmit antenna on the receive antenna.

On the basis of this technical solution, the two transmit antennas are replaced with receive antennas, and the receive antenna is replaced with a transmit antenna. In this case, the power splitter functions to combine power to obtain an antenna system of "two receivers and one transmitter" (two receive antennas and one transmit antenna). The principle thereof is the same as the technical solution in the literature, as shown in FIG. 2.

The solutions illustrated in FIG. 1 and FIG. 2 use an assistance antenna to generate an interference offsetting signal, which increases the number of antennas.

Another existing technical solution is to increase a distance between transmit and receive antennas. An increased distance between antennas may increase a free space loss of interference, so as to increase the isolation between the transmit and receive antennas. However, the increased distance between antennas results in a larger size of the overall antenna system.

SUMMARY

In view of this, the present invention provides an antenna system to simplify the number of antennas and a distance between the antennas for an antenna system.

In a first aspect, the present invention provides an antenna system, including a transmit antenna, a receive antenna, a radome above the transmit antenna and the receive antenna, and a reflector within the radome, wherein a signal received by the receive antenna after a transmitted signal of the transmit antenna is reflected by the reflector offsets an intra-frequency interference signal generated because the transmitted signal of the transmit antenna is directly received by the receive antenna.

With reference to the first aspect, in a first possible implementation, the offsetting, by the signal received by the receive antenna after the transmitted signal of the transmit antenna is reflected by the reflector, of the intra-frequency interference signal generated because the transmitted signal of the transmit antenna is directly received by the receive antenna specifically includes that an amplitude of the signal received by the receive antenna after the transmitted signal of the transmit antenna is reflected by the reflector equals an amplitude of the intra-frequency interference signal generated because the transmitted signal of the transmit antenna is directly received by the receive antenna, and a phase difference is $(2n+1)\pi$, where $n=0, \pm 1, \pm 2, \ldots$.

With reference to the first possible implementation of the first aspect, in a second possible implementation, a distance from the transmit antenna to an incident point of the reflector is $l_1$, a distance from the receive antenna to the incident point of the reflector is $l_2$, a distance from the transmit antenna to the receive antenna is D, a reflection coefficient of the reflector is $\Gamma$, and the difference between the phase of the signal received by the receive antenna after the transmitted signal of the transmit antenna is reflected by the reflector and the phase of the intra-frequency interference signal generated because the transmitted signal of the transmit antennas is directly received by the receive antenna is:

$$\left| \frac{2\pi}{\lambda}(l_1 + l_2 - D) + \varphi \right|$$

and $$\left| \frac{2\pi}{\lambda}(l_1 + l_2 - D) + \varphi \right| = (2n+1) \cdot \pi$$

Where $n=0, 1, 2, \ldots$, $\lambda$ is a carrier wavelength, and $\varphi$ is a phase of the reflection coefficient $\Gamma$.

With reference to the first possible implementation of the first aspect, in a third possible implementation, a reflection coefficient of the reflector is $\Gamma$, $\theta_1^T$ and $\phi_1^T$ are incident carrier angles from the transmit antenna to the reflector, $\theta_1^R$ and $\phi_1^R$ are carrier angles for the receive antenna to receive the signal reflected by the reflector, $\theta_2^T$ and $\phi_2^T$ are carrier angles of the intra-frequency interference signal generated by the transmit antenna to the receive antenna, and $\theta_2^R$ and $\phi_2^R$ are carrier angles for the receive antenna to receive the intra-frequency interference signal generated by the transmit antenna; then, the amplitude of the signal received by the receive antenna after the transmitted signal of the transmit antenna is reflected by the reflector is:

$$G^T(\theta_1^T,\phi_1^T,f) \cdot PL(f,l_1) \cdot |\Gamma| \cdot PL(f,l_2) \cdot G^R(\theta_1^R,\phi_1^R,f)$$

The amplitude of the intra-frequency interference signal generated because the transmitted signal of the transmit antenna is directly received by the receive antenna is:

$$G^T(\theta_2^T,\phi_2^T,f) \cdot PL(f,D) \cdot G^R(\theta_2^R,\phi_2^R,f)$$

and $$G^T(\theta_1^T,\phi_1^T,f) \cdot PL(f,l_1) \cdot |\Gamma| \cdot PL(f,l_2) \cdot G^R(\theta_1^R,\phi_1^R,f) = G^T(\theta_2^T,\phi_2^T,f) \cdot PL(f,D) \cdot G^R(\theta_2^R,\phi_2^R,f)$$

where f is a carrier frequency, $|\Gamma|$ is an amplitude of the reflection coefficient $\Gamma$, $G^T(\theta_1^T, \theta_1^T, f)$ is a transmitted carrier gain from the transmit antenna to the reflector, $G^R(\theta_1^R, \phi_1^R, f)$ is a carrier gain for the receive antenna to receive a reflected carrier of the reflector, $G^T(\theta_2^T, \phi_2^T, f)$ is a transmitted carrier gain of the intra-frequency interference signal generated because the transmitted signal of the transmit antenna is directly received by the receive antenna, $G^R(\theta_2^R, \phi_2^R, f)$ is a carrier gain for the receive antenna to receive the intra-frequency interference signal generated by the transmit antenna, $PL(f, l_1)$ and $PL(f, l_2)$ are a path loss from the transmit antenna to the reflector and a path loss from the reflector to the receive antenna respectively, and $PL(f, D)$ is a path loss from the transmit antenna to the receive antenna.

With reference to any one of the first aspect to the third possible implementation of the first aspect, in a fourth possible implementation, the reflector is a medium having a single dielectric constant.

With reference to any one of the first aspect to the third possible implementation of the first aspect, in a fifth possible implementation, the reflector is a conductor.

With reference to any one of the first aspect to the third possible implementation of the first aspect, in a sixth possible implementation, the reflector is made by stacking media having different dielectric constants.

With reference to any one of the first aspect to the third possible implementation of the first aspect, in a seventh possible implementation, the reflector includes multiple media having different dielectric constants, and the multiple media are arranged discretely in a Y-axis direction of an XYZ three-dimensional coordinate system.

With reference to any one of the first aspect to the third possible implementation of the first aspect, in an eighth possible implementation, the reflector is completely embedded into the radome, the reflector is partially embedded into the radome, or the reflector is fixed to an inner surface of the radome.

According to the above description, in some feasible implementations of the present invention, an antenna system includes a transmit antenna, a receive antenna, a radome above the transmit antenna and the receive antenna, and a reflector within the radome, where a signal received by the receive antenna after a transmitted signal of the transmit antenna is reflected by the reflector offsets an intra-frequency interference signal generated because the transmitted signal of the transmit antenna is directly received by the receive antenna. As a result, according to the embodiments of the present invention, the intra-frequency interference signal of the transmit antenna to the receive antenna may be eliminated without increasing the number of antennas and a distance between antennas.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The present invention is described in detail below with reference to specific embodiments.

Figure 3:
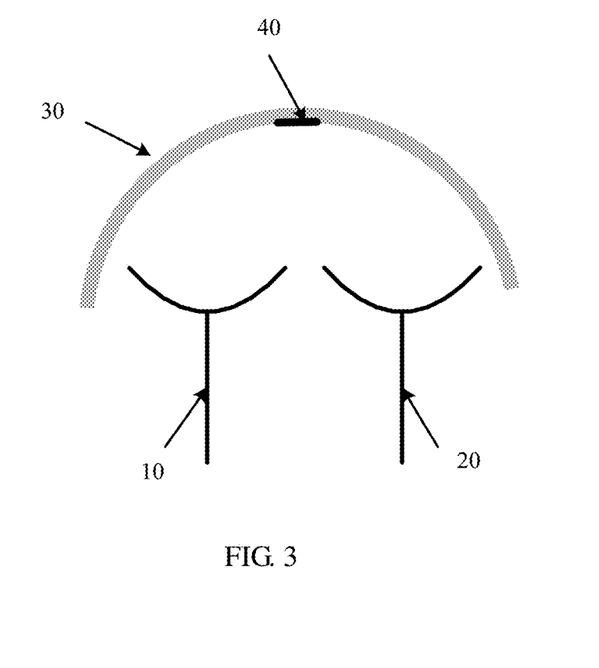
FIG. 3 is a schematic structural diagram of an antenna system according to an embodiment of the present invention.

FIG. 3 is a schematic structural diagram of an antenna system according to an embodiment of the present invention. As shown in FIG. 3, the antenna system according to an embodiment of the present invention may include a transmit antenna 10, a receive antenna 20, a radome 30 above the transmit antenna 10 and the receive antenna 20, and a reflector 40 within the radome 30. Specifically, a signal received by the receive antenna 20 after a transmitted signal of the transmit antenna 10 is reflected by the reflector 40 offsets an intra-frequency interference signal (that is, the intra-frequency interference signal of the transmit antenna 10 to the receive antenna 20) generated because the transmitted signal of the transmit antenna 10 is directly received by the receive antenna 20.

In some feasible implementations, the offsetting, by the signal received by the receive antenna 20 after the transmitted signal of the transmit antenna 10 is reflected by the reflector 40, the intra-frequency interference signal generated because the transmitted signal of the transmit antenna 10 is directly received by the receive antenna 20 specifically includes that: an amplitude of the signal received by the receive antenna 20 after the transmitted signal of the transmit antenna 10 is reflected by the reflector 40 equals an amplitude of the intra-frequency interference signal generated because the transmitted signal of the transmit antenna 10 is directly received by the receive antenna 20, and a phase difference is $(2n+1)\pi$, where $n = 0, \pm 1, \pm 2, \ldots$.

In some feasible implementations, the radome may be in any shape, for example, a plane, a paraboloid, a spherical surface, and the like.

Figure 4:
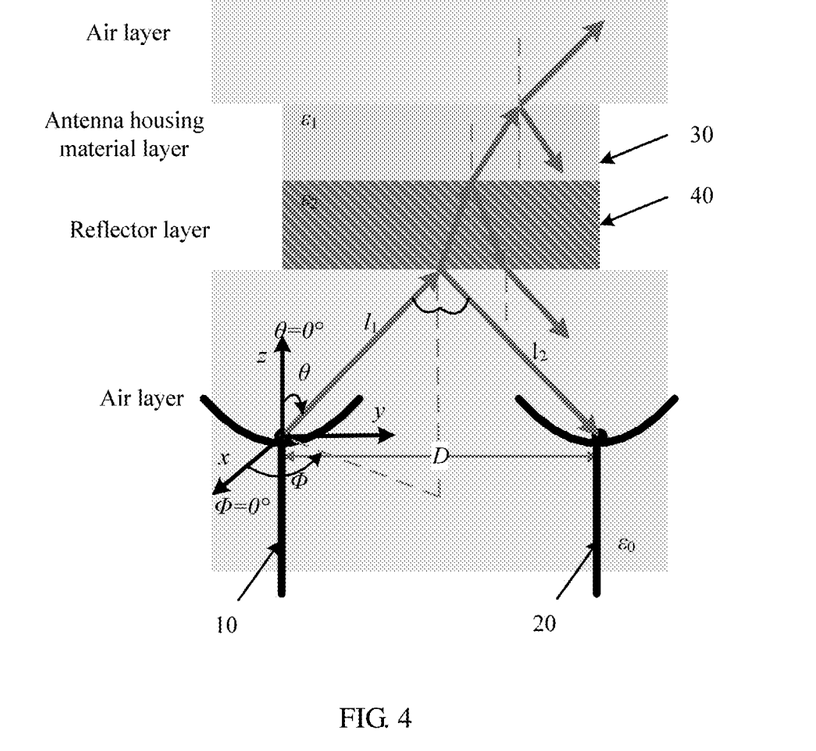
FIG. 4 is a schematic diagram illustrating a reflection principle of an antenna system according to the present invention.

Further, FIG. 4 is a schematic diagram illustrating a signal transmission principle of the antenna system according to the present invention. As shown in FIG. 4, reflection and transmission of a transmitted signal carrier of the transmit antenna 10 is performed in areas of four layers of media, which, from bottom to top, are: an air layer (having a dielectric constant $\in_0$), a reflector layer (having a dielectric constant $\in_2$), a radome material layer (having a dielectric constant $\in_1$), and an air layer (having a dielectric constant $\in_0$). In FIG. 4, an example where a direction of a main lobe of the antenna is parallel to a normal line to a boundary surface of the reflector is described. A projection point of the transmitted signal is at an intersection point between a perpendicular bisector of a connecting line from the transmit antenna 10 to the receive antenna 20, and the boundary surface of the reflector 40. Assume that a gain of the transmit antenna 10 and the receive antenna 20 is $G^T(\theta, \phi, f)$ and $G^R(\theta, \phi, f)$ respectively, which are a function of an antenna operation frequency f and spherical coordinates $\theta$ (an angle between a carrier and a Z axis of a spherical coordinate system) and $\phi$ (an angle between an X axis and the carrier that is projected to an X-Y plane of the spherical coordinate system) of spherical coordinate system. In a specific implementation, the gain of the antenna may be obtained by measurement. In an example where a direction of a main lobe of the antenna is $\theta=0°$, according to FIG. 4, a value of $\theta$ and $\phi$ of the carrier of the transmit antenna 10 projected on the reflector 40 may be:

$$\theta \in \left(0, \frac{\pi}{2}\right), \phi \in (0, \pi)$$

Assume that a reflection coefficient of an electromagnetic wave on a medium surface is $\Gamma$, and let $\Gamma=|\Gamma|e^{j\varphi}$, where $|\Gamma|$ is an amplitude of the reflection coefficient $\Gamma$, and $\varphi$ is a phase of the reflection coefficient $\Gamma$, then, a phase variation of the signal received by the receive antenna 20 after the transmitted signal of the transmit antenna 10 is reflected by the reflector 40 is:

$$\Delta\varphi_1 = 2\pi \cdot f \cdot \left(\frac{l_1+l_2}{c}\right) + \varphi \qquad (1)$$

where f is a carrier frequency, c is the speed of light, and $l_1$ and $l_2$ are a distance respectively from the transmit antenna 10 and the receive antenna 20 to an incident point of the reflector 40; and when the incident point is on the perpendicular bisector of the connecting line from the transmit antenna 10 to the receive antenna 20, $l_1=l_2=l$.

A phase variation of the intra-frequency interference signal received by the receive antenna 20 relative to that at the transmit antenna 10 is:

$$\Delta\varphi_2 = 2\pi \cdot f \cdot \frac{D}{c} \qquad (2)$$

where D is a distance between the transmit antenna 10 and the receive antenna 20.

In order to offset the phase of the intra-frequency interference signal of the transmit antenna 10 to the receive antenna 20, the phase variation $\Delta\varphi_1$ of the signal of the transmit antennas 10 reflected by the reflector 40 to the receive antennas 20 and the phase variation $\Delta\varphi_2$ of the intra-frequency interference signal of the transmit antenna 10 to the receive antenna 20 satisfy the following relationship:

$$|\Delta\varphi_1 - \Delta\varphi_2| = \left|\left(2\pi f \cdot \frac{l_1+l_2}{c} + \varphi\right) - 2\pi f \cdot \frac{D}{c}\right| \qquad (3)$$

$$= \left|\frac{2\pi}{\lambda}(l_1+l_2-D) + \varphi\right|$$

$$= (2n+1)\cdot\pi \quad n=0,1,2,\ldots$$

where $\lambda$ is a carrier wavelength.

Further, let $\theta_1^T$ and $\phi_1^T$ be transmitted carrier angles from the transmit antenna 10 to the reflector 40 (with reference to FIG. 4, assume that the transmitted carrier from the transmit antenna 10 to the reflector 40 is incident on the reflector 40 in an $l_1$ direction, then, $\theta_1^T$ and $\phi_1^T$ may be $\theta$ and $\phi$ in FIG. 4 respectively, where $\theta$ is an angle between $l_1$ and a Z axis, $\phi$ is an angle between $l_1$ projected on the X-Y plane and the X axis, that is, $\phi$ specifically is an angle between a dashed line between the X and Y axes and the X axis); $\theta_1^R$ and $\phi_1^R$ are received carrier angles for the receive antenna 20 to receive the signal reflected by the reflector 40, $\theta_2^T$ and $\phi_2^T$ are carrier angles of the intra-frequency interference signal generated by the transmit antenna to the receive antenna; and $\theta_2^R$ and $\phi_2^R$ are received carrier angles for the receive antenna 20 to receive the intra-frequency interference signal of the transmit antenna 10.

In order to offset the amplitude of the intra-frequency interference signal of the transmit antenna 10 to the receive antenna 20, the amplitude of the signal received by the receive antenna after the transmitted signal of the transmit antenna is reflected by the reflector needs to equal the amplitude of the intra-frequency interference signal generated because the transmitted signal of the transmit antenna is directly received by the receive antenna, which specifically satisfies:

$$P_{TX} \cdot G^T(\theta_1^T, \phi_1^T, f) \cdot PL(f, l_1) \cdot |\Gamma| \cdot PL(f, l_2) \cdot G^R(\theta_1^R, \phi_1^R, f) = P_{TX} \cdot G(\theta_2^T, \phi_2^T, f) \cdot PL(f, D) \cdot G^R(\theta_2^R, \phi_2^R, f) \qquad (4)$$

where $P_{TX}$ is a power of the transmit antenna 10, f is a carrier frequency, $|\Gamma|$ is the amplitude of the reflection coefficient $\Gamma$, $G^T(\theta_1^T, \phi_1^T, f)$ is a gain of the transmitted carrier from the transmit antenna 10 to the reflector 40, $G^R(\theta_1^R, \phi_1^R, f)$ is a gain for the receive antenna 20 to receive the reflected carrier of the reflector 40, $G^T(\theta_2^T, \phi_2^T, f)$ is a gain in a direction of the intra-frequency interference signal caused by the transmit antenna 10 to the receive antenna 20, $G^R(\theta_2^R, \phi_2^R, f)$ is a gain for the receive antenna 20 to receive the intra-frequency interference, $PL(f, l_1)$ and $PL(f, l_2)$ are a path loss from the transmit antenna 10 to the reflector 40 and a path loss from the reflector 40 to the receive antenna 20 respectively; and $PL(f, D)$ is an interference path loss from the transmit antenna 10 to the receive antenna 20.

Equation (4) is normalized to obtain:

$$G_T(\theta_1^T, \phi_1^T, f) \cdot PL(f, l_1) \cdot |\Gamma| \cdot PL(f, l_2) \cdot G^R(\theta_1^R, \phi_1^R, f) = G^T(\theta_2^T, \phi_2^T, f) \cdot PL(f, D) \cdot G^R(\theta_2^R, \phi_2^R, f) \qquad (5)$$

According to equation (3), in an actual implementation of the embodiment of the present invention, the phase of the intra-frequency interference signal may be offset by adjusting the location relationship between the reflector 40, the transmit antenna 10, and the receive antenna 20 (that is, adjusting $l_1$, $l_2$, and D).

According to equation (5), in an actual implementation, in cases where the location relationship between the reflector 40, the transmit antenna 10, and the receive antenna 20 is given (that is, values other than $|\Gamma|$ in equation (5) are determined), in the embodiment of the present invention, the amplitude of the intra-frequency interference signal may be offset by selecting a reflector 40 having a proper reflection coefficient Γ (that is, selecting a proper |Γ|). In an actual implementation, a method for calculating a reflection coefficient is available in the prior art, and is not described in detail in the present invention.

In some feasible embodiments, the reflector is a medium having a single dielectric constant. In this case, the distance from the transmit antenna 10 to the incident point of the reflector 40 is a distance from the transmit antenna to an incident point of the medium having the single dielectric constant; and the distance from the receive antenna 20 to the reflector 40 is a distance from the receive antenna to the incident point of the medium having the single dielectric constant.

In some feasible embodiments, the reflector is a conductor. In this case, the distance from the transmit antenna 10 to the incident point of the reflector 40 is a distance from the transmit antenna to an incident point of conductor; and the distance from the receive antenna 20 to the reflector 40 is a distance from the receive antenna to the incident point conductor.

Figure 5:
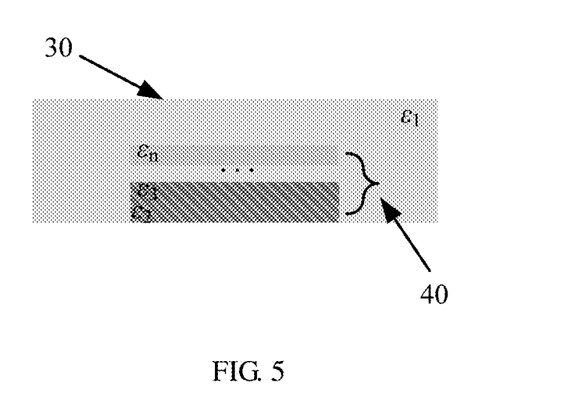
FIG. 5 is a schematic diagram illustrating a distribution of a reflector according to an embodiment of the present invention.

In some feasible embodiments, in order to satisfy the Γ value required in equation (3) and equation (5), the reflector 40 may be made by stacking media having different dielectric constants, as shown in FIG. 5.

In some feasible embodiments, in order to satisfy the phase relationship of equation (3) and the amplitude relationship of equation (5), the reflector 40 may be made by using multiple media that are arranged discretely. In a rectangular coordinate system illustrated in FIG. 6, the Y axis may be selected as a discrete direction. That is, the reflector 40 includes multiple media, and the multiple media are arranged discretely in a Y-axis direction in an XYZ three-dimensional coordinate system. The multiple media of the reflector 40 may have the same or different dielectric constants; each of the medium among the multiple media may be a single-layer medium, a conductor, or a medium stacking multiple layers together; each of the medium among the multiple media may be completely embedded into the radome, partially embedded into the radome, or fixed to an inner surface of the radome.

Figure 6:
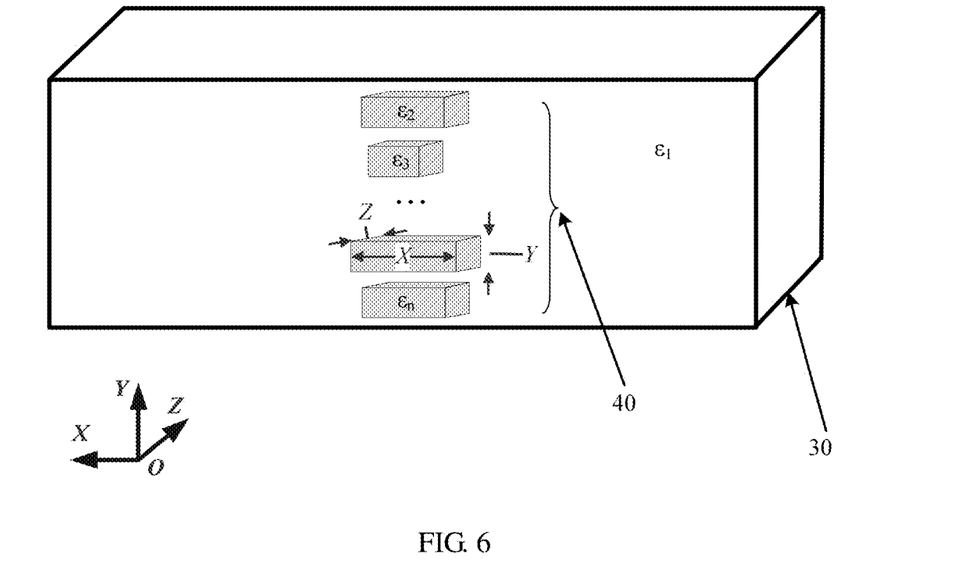
FIG. 6 is a schematic diagram illustrating a distribution of a reflector according to another embodiment of the present invention.

In some feasible embodiments, other than the incident point that strictly complies with equation (3) and equation (5), as shown in FIG. 6, there are some other incident points (for example, an incident point on the X axis) on the reflector 40, where a difference between a phase variation $\Delta\varphi_1$ generated because the carrier transmitted by the transmit antenna 10 is received by the receive antenna 20 after being reflected by these incident points on the reflector 40 and a phase variation $\Delta\varphi_2$ of the interference of the transmit antenna 10 to the receive antenna 20 is close to $(2n+1)\pi$, where n=0, ±1, ±2, . . . , which also helps to offset the interference. Therefore, the reflector 40 further includes a part of media in the X direction, where a difference between the phase variation $\Delta\varphi_1$ generated because the carrier transmitted by the transmit antenna 10 is received by the receive antenna 20 after they are incident on these media of the reflector 40 and reflected, and the phase variation $\Delta\varphi_2$ of the interference of the transmit antenna 10 on the receive antenna 20 satisfies the following equation:

$$(2n+1)\pi \pm \frac{\pi}{6}, n = 0, \pm 1, \pm 2, \ldots .$$

In some feasible embodiments, the dielectric constant of the reflector according to the embodiment of the present invention may be smaller or greater than a dielectric constant of the radome.

Figure 7:
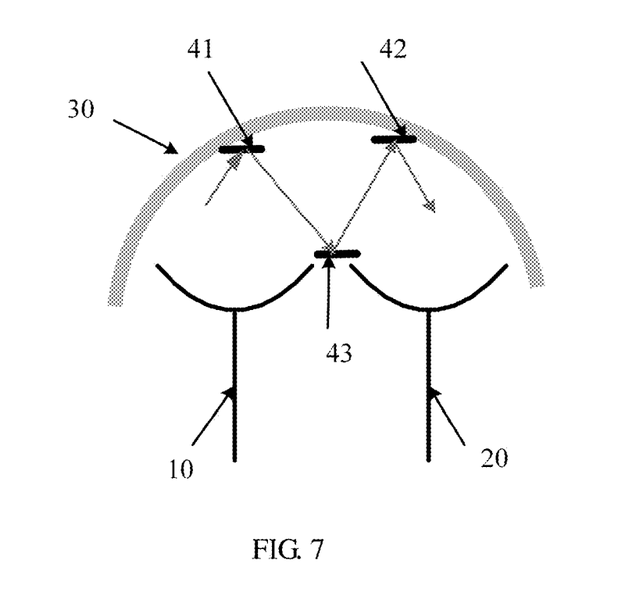
FIG. 7 is a schematic structural diagram of an antenna system according to another embodiment of the present invention.

In some feasible embodiments, the reflector according to the embodiment of the present invention may also be multiple reflectors distributed discretely in space. Positions of these reflectors may be properly adjusted, so that a difference between a phase variation caused because the carrier transmitted by the transmit antenna is received by the receive antenna after being incident on these reflectors and being reflected multiple times, and a phase variation of the interference of the transmit antenna to the receive antenna still can satisfy $(2n+1)\pi$, where n=0, ±1, ±2, . . . . Moreover, an amplitude of the signal received by the receive antenna after the transmitted signal of the transmit antenna is reflected by the reflector may still equal an amplitude of the intra-frequency interference signal generated because the transmitted signal of the transmit antenna is directly received by the receive antenna. For example, in FIG. 7 illustrates an embodiment where an intra-frequency interference signal is eliminated after reflection is performed by three reflectors (which are a reflector 41 having a dielectric constant $\in_2$, a reflector 42 having a dielectric constant $\in_3$, and a reflector 43 having a dielectric constant $\in_4$). In a specific implementation, when multiple reflectors are distributed discretely in space to eliminate the intra-frequency interference signal, dielectric constants of the selected reflectors may be the same or different.

Figure 8:
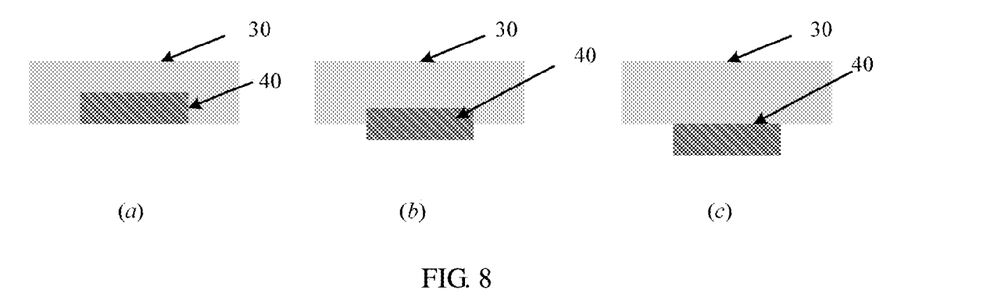
FIG. 8 is a schematic diagram illustrating a position relationship between a reflector and a radome according to an embodiment of the present invention.

In some feasible embodiments, as shown in FIG. 8, the reflector may be completely embedded into the radome ((a) in FIG. 8), the reflector is partially embedded into the radome ((b) in FIG. 8), or the reflector is fixed to an inner surface of the radome ((c) in FIG. 8). The reflector 40 in FIG. 8 may also be replaced with any one of the reflector 41, the reflector 42, and the reflector 43.

In some feasible embodiments, the transmit antenna and the receive antenna according to the present invention may be directional antennas and omnidirectional antennas.

It is obvious that a person skilled in the art may make various modifications and alterations to the present invention without departing from the spirit and scope of the present invention. Therefore, the idea of the present invention also entails these modifications and alterations if the modifications and alterations to the present invention fall within the scope of the claims and the equivalent technologies.

What is claimed is:

1. An antenna system, comprising:
   a transmit antenna;
   a receive antenna;
   a radome above the transmit antenna and the receive antenna; and
   a reflector embedded within the radome, wherein the reflector is positioned in a manner that a signal received by the receive antenna after a transmitted signal of the transmit antenna is reflected by a first incident point of the reflector offsets an intra-frequency interference signal of the transmit antenna on the receive antenna, and wherein of the transmit antenna, the receive antenna, and the reflector are positioned in a manner that an amplitude of the signal received by the receive antenna after the transmitted signal of the transmit antenna is reflected by the reflector equals an amplitude of the intra-frequency interference signal, wherein the reflector comprises a plurality of stacked layers, each layer having a different dielectric constant than a dielectric constant of adjacent layers, each layer being embedded within the radome, and wherein the radome covers a first sidewall of the plurality of stacked layers and a second sidewall of the plurality of stacked layers, the first sidewall being opposite to the second sidewall.

2. The antenna system according to claim 1, wherein a phase difference between the signal received by the receive antenna after the transmitted signal of the transmit antenna is reflected by the reflector and the intra-frequency interference signal is $(2n+1)\pi$, where n is an integer.

3. The antenna system according to claim 2, wherein the difference between the phase of the signal received by the receive antenna after the transmitted signal of the transmit antenna is reflected by the reflector and the phase of the intra-frequency interference signal is described by the relation $$\left| \frac{2\pi}{\lambda}(l_1 + l_2 - D) + \varphi \right| = (2n+1) \cdot \pi,$$

wherein n is an integer, a distance from the transmit antenna to an incident point of the reflector is $l_1$, a distance from the receive antenna to the incident point of the reflector is $l_2$, a distance from the transmit antenna to the receive antenna is D; a reflection coefficient of the reflector is $\Gamma$, $\lambda$ is a carrier wavelength, and $\varphi$ is a phase of the reflection coefficient $\Gamma$.

4. The antenna system according to claim 1, wherein the amplitude of the signal received by the receive antenna after the transmitted signal of the transmit antenna is reflected by the reflector is determined by the relation:

$G^T(\theta_1^T, \phi_1^T, f) \cdot PL(f, l_1) \cdot |\Gamma| \cdot PL(f, l_2) \cdot G^R(\theta_1^R, \phi_1^R, f),$ wherein the amplitude of the intra-frequency interference signal is determined by the relation:

$G^T(\theta_2^T, \phi_2^T, f) \cdot PL(f, D) \cdot G^R(\theta_2^R, \phi_2^R, f);$ and wherein a reflection coefficient of the reflector is $\Gamma$, $\theta_1^T$ and $\phi_1^T$ are incident carrier angles from the transmit antenna to the reflector, $\theta_1^R$ and $\phi_1^R$ are carrier angles for the receive antenna to receive the signal reflected by the reflector, $\theta_2^T$ and $\phi_2^T$ are carrier angles of the intra-frequency interference signal, and $\theta_2^R$ and $\phi_2^R$ are carrier angles for the receive antenna to receive the intra-frequency interference signal, f is a carrier frequency, $|\Gamma|$ is an amplitude of the reflection coefficient $\Gamma$; $G^T(\theta_1^T, \phi_1^T, f)$ is a transmitted carrier gain from the transmit antenna to the reflector; $G^R(\theta_1^R, \phi_1^R, f)$ is a carrier gain for the receive antenna to receive a reflected carrier of the reflector; $G^T(\theta_2^T, \phi_2^T, f)$ is a transmitted carrier gain of the intra-frequency interference signal; $G^R(\theta_2^R, \phi_2^R, f)$ is a carrier gain for the receive antenna to receive the intra-frequency interference signal; $PL(f, l_1)$ and $PL(f, l_2)$ are a path loss from the transmit antenna to the reflector and a path loss from the reflector to the receive antenna respectively; and $PL(f, D)$ is a path loss from the transmit antenna to the receive antenna.

5. The antenna system according to claim 1, wherein the plurality of stacked layers are arranged discretely in a Y-axis direction of an XYZ three-dimensional coordinate system.

6. The antenna system according to claim 1, wherein the antenna system comprises a plurality of reflectors within the radome, wherein a signal is received by the receive antenna after a transmitted signal of the transmit antenna is reflected by each of the plurality of reflectors, and wherein an amplitude of the signal received by the receive antenna after the transmitted signal of the transmit antenna is reflected by each of the plurality of reflectors equals the amplitude of the intra-frequency interference signal.

7. The antenna system according to claim 1, wherein the reflector is configured in a manner that a second incident point of the reflector is positioned next to the first incident point along an X-axis direction, and a phase difference between a signal received by the receive antenna after the transmitted signal of the transmit antenna is reflected by the second incident point of the reflector and the intra-frequency interference signal is $(2n+1)\pi \pm \pi/6$, where n is an integer.

8. A method of forming an antenna system, comprising:
providing a transmit antenna, a receive antenna, and a radome above the transmit antenna and the receive antenna, wherein the transmit antenna, the receive antenna, and the radome are located at fixed distances with relation to each other;
determining a dielectric constant of a first reflector to be positioned within the radome, the dielectric constant being determined so that a signal received by the receive antenna after a transmitted signal of the transmit antenna is reflected by the first reflector having the determined dielectric constant has an amplitude that equals an amplitude of an intra-frequency interference signal from the transmit antenna to the receive antenna and the intra-frequency interference signal is offset, wherein the dielectric constant of the first reflector is determined according to the fixed relational distances between the transmit antenna, the receive antenna, and the radome;
forming the first reflector having the determined dielectric constant, the forming comprising stacking a plurality of layers to form the first reflector having the determined dielectric constant, each layer having a different dielectric constant than dielectric constants of adjacent layers; and
providing the first reflector having the determined dielectric constant and embedding the first reflector in the radome at a pre-determined position, wherein each layer of the plurality of layers of the first reflector is embedded within the radome, and the radome covers a first sidewall of the stacked plurality of layers and a second sidewall of the stacked plurality of layers, the first sidewall being opposite to the second sidewall.

9. The method according to claim 8, further comprising positioning a second reflector in the radome, wherein a signal received by the receive antenna after a transmitted signal of the transmit antenna is reflected by the first reflector and the second reflector equals the amplitude of the intra-frequency interference signal.

10. The method according to claim 8, wherein the first reflector is laterally positioned between the receive antenna and the transmit antenna.

11. A method of forming an antenna system, comprising:
providing a transmit antenna, a receive antenna, a radome above the transmit antenna and the receive antenna, and a first reflector within the radome, wherein the first reflector comprises a plurality of stacked layers, each layer having a different dielectric constant than dielectric constants of adjacent layers, and the first reflector has a fixed dielectric constant according to the dielectric constants of the plurality of stacked layers, and each layer of the plurality of stacked layers is embedded within the radome, and wherein the radome covers a first sidewall of the plurality of stacked layers and a second sidewall of the plurality of stacked layers, the first sidewall being opposite to the second sidewall;

determining relative positions of the receive antenna, the transmit antenna, the radome and the first reflector so that a signal received by the receive antenna after a transmitted signal of the transmit antenna is reflected by a first incident point of the first reflector has an amplitude that equals an amplitude of an intra-frequency interference signal from the transmit antenna to the receive antenna, so that the intra-frequency interference signal is offset, wherein the relative positions are determined at least in part according to the fixed dielectric constant of the first reflector; and positioning the receive antenna, the transmit antenna, the radome and the first reflector according to the determined relative positions.

12. The method according to claim 11, further comprising determining relative positions of the receive antenna, the transmit antenna, the radome and the first reflector so that a phase difference between the signal received by the receive antenna after the transmitted signal of the transmit antenna is reflected by the first incident point of the first reflector and the intra-frequency interference signal is $(2n+1)\pi$, and a phase difference between a signal received by the receive antenna after the transmitted signal of the transmit antenna is reflected by a second incident point of the first reflector and the intra-frequency interference signal is $(2n+1)\pi \pm \pi/6$, where n is an integer.

13. The method according to claim 11, wherein the first reflector is laterally positioned between the receive antenna and the transmit antenna.

\* \* \* \* \*

UNITED STATES PATENT AND TRADEMARK OFFICE
CERTIFICATE OF CORRECTION

PATENT NO. : 9,941,585 B2  
APPLICATION NO. : 14/752256  
DATED : April 10, 2018  
INVENTOR(S) : Yu Liu et al.

Page 1 of 1

It is certified that error appears in the above-identified patent and that said Letters Patent is hereby corrected as shown below:

In the Claims

In Column 8, Line 60, Claim 1, delete "and wherein of the transmit antenna" and insert --and wherein the transmit antenna--.

Signed and Sealed this  
Nineteenth Day of June, 2018

Andrei Iancu  
*Director of the United States Patent and Trademark Office*